United States Patent
Sudo

(10) Patent No.: US 7,746,593 B2
(45) Date of Patent: Jun. 29, 2010

(54) METHOD AND APPARATUS FOR DETERMINING OFFSET BETWEEN READ HEAD AND WRITE HEAD IN A DISK DRIVE

(75) Inventor: Daisuke Sudo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/391,899

(22) Filed: Feb. 24, 2009

(65) Prior Publication Data
US 2009/0268337 A1 Oct. 29, 2009

(30) Foreign Application Priority Data
Apr. 23, 2008 (JP) .............................. 2008-113058

(51) Int. Cl.
*G11B 5/596* (2006.01)
(52) U.S. Cl. ............... 360/77.02; 360/77.04; 360/77.08
(58) Field of Classification Search ....................... None
See application file for complete search history.

(56) References Cited

U.S. PATENT DOCUMENTS

| 4,149,199 | A * | 4/1979 | Chick et al. ............. 360/77.04 |
| 2001/0028522 | A1 * | 10/2001 | Suzuki et al. ................ 360/53 |
| 2007/0230026 | A1 | 10/2007 | Takaishi |
| 2007/0242387 | A1 | 10/2007 | Kawabe |
| 2008/0002280 | A1 | 1/2008 | Asakura |

FOREIGN PATENT DOCUMENTS

| JP | 2005-166115 | 6/2005 |
| JP | 2005-216378 | 8/2005 |
| JP | 2005-216378 A | 8/2005 |
| JP | 2007-172733 | 7/2007 |
| JP | 2007-265530 | 10/2007 |
| JP | 2007-265546 | 10/2007 |
| JP | 2007-265546 A | 10/2007 |

OTHER PUBLICATIONS

An English Translation of Notification of Reasons for Rejection mailed by Japan Patent Office for Japanese Patent Application No. 2008-113058 on Apr. 28, 2009.
Notice of Reasons for Rejection received in corresponding Japanese Application No. 2008-113058, mailed May 12, 2009, 10 pages.

* cited by examiner

*Primary Examiner*—Andrew L Sniezek
(74) *Attorney, Agent, or Firm*—Knobbe, Martens, Olson & Bear, LLP

(57) ABSTRACT

According to one embodiment, a disk drive is disclosed which has an offset measuring function for measuring a dynamic offset value necessary to a dynamic offset control using a DTM (discrete track media) type disk. A CPU (microprocessor) included in the disk drive writes offset measuring position information to an optimum position of lands on the disk and calculates a dynamic offset value based on the offset measuring position information.

10 Claims, 8 Drawing Sheets

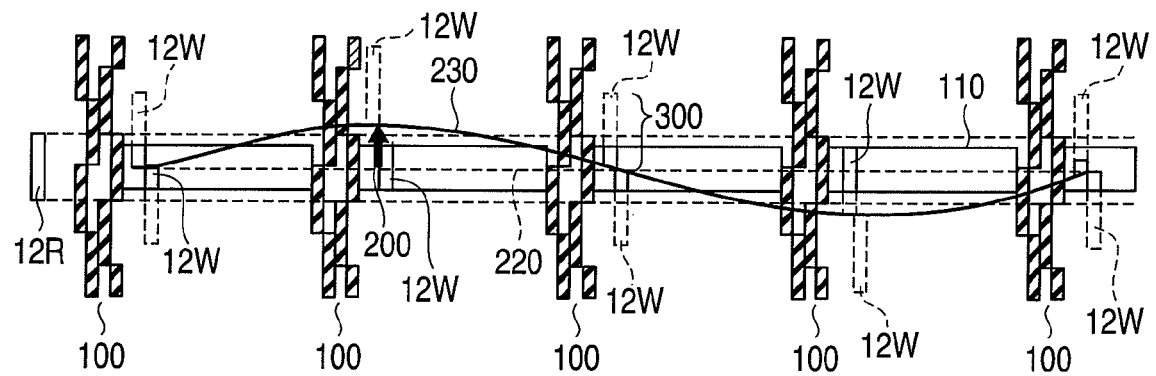
F I G. 6
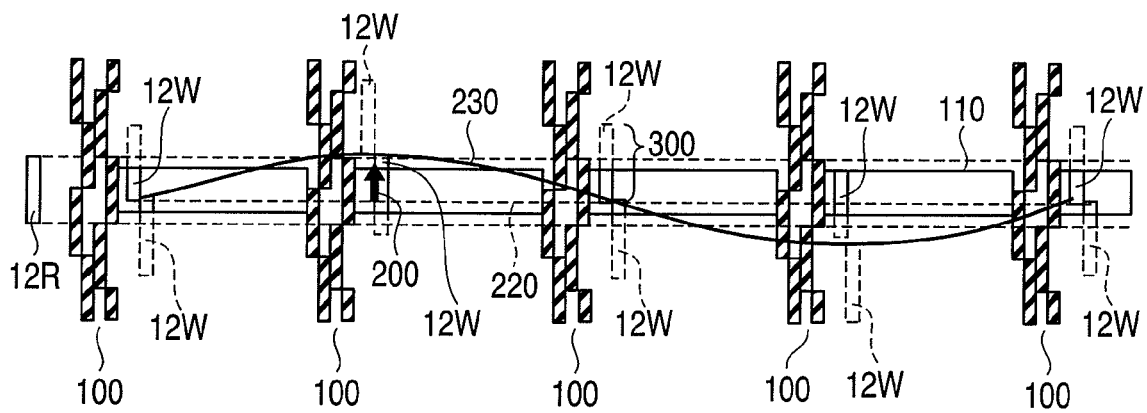
F I G. 7
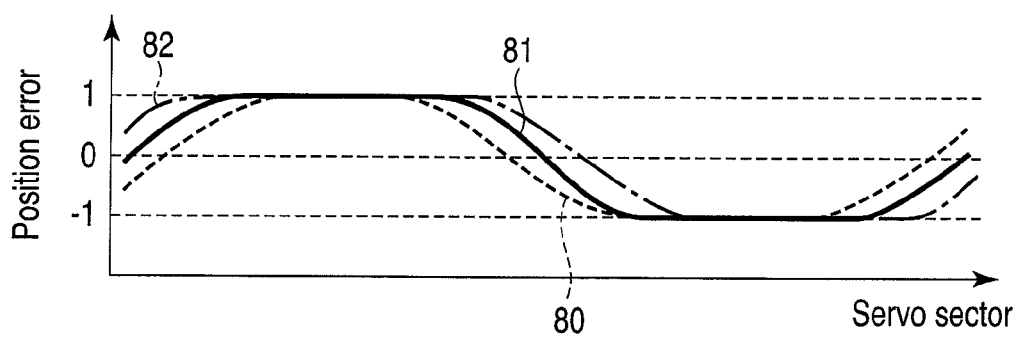
F I G. 8

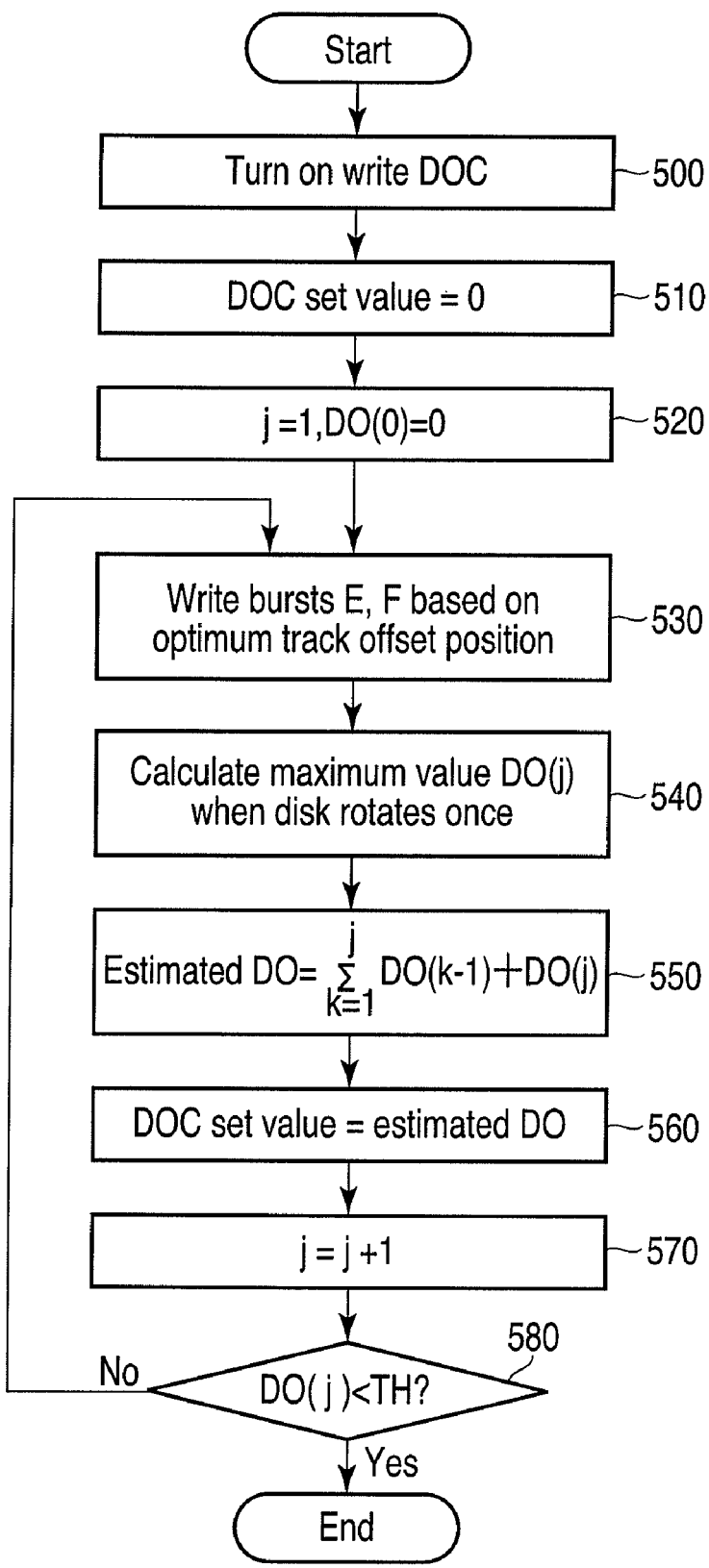
F I G. 18

METHOD AND APPARATUS FOR DETERMINING OFFSET BETWEEN READ HEAD AND WRITE HEAD IN A DISK DRIVE

CROSS-REFERENCE TO RELATED APPLICATIONS

This application is based upon and claims the benefit of priority from Japanese Patent Application No. 2008-113058, filed Apr. 23, 2008, the entire contents of which are incorporated herein by reference.

BACKGROUND

1. Field

One embodiment of the present invention relates to a disk drive, and more particularly to a technique for measuring an offset between a read head and a write head using a disk as a discrete track medium.

2. Description of the Related Art

Recently, in a disk drive typically represented by a hard disk drive, attention is paid to a discrete track medium (DTM) type disk as a disk which is a magnetic recording medium. In the DTM type disk, a pattern is formed on a substrate, and the pattern has a magnetic region, which is a magnetic recording region of data, and a non-magnetic region (nonmagnetic guard band) which are separated from each other. The disk drive positions a magnetic head on a designated magnetic region and records data or reproduces recorded data. The magnetic region in which data is recorded may be called a data track.

The magnetic head has a structure in which a read head and a write head are separately mounted on one slider (head body). The read head is a head for reading out data from on a disk. The write head is a head for writing data onto the disk. In the magnetic head having the structure described above, an offset exists between the read head and the write head. Accordingly, a certain amount of offset (positional dislocation) occurs in a track locus of each of the read head and the write head depending on a radial position on a disk medium.

In a disk drive, when a magnetic head is positioned to a position designated on a disk, an offset control is executed to each of a read head and a write head to perform a positional adjustment based on a measured offset value. In the offset control, a dynamic offset control (DOC) is effective which executes a control using an offset value which changes when a disk rotates once in consideration of a disk runout and the like (refer to, for example, Jpn. Pat. Appln. KOKAI Publication No. 2005-216378).

To measure an offset value necessary to an offset control, there is conventionally proposed a method of calculating an offset value by recording data for measurement on a DTM type disk and reading out the data for measurement by a magnetic head (refer to, for example, Jpn. Pat. Appln. KOKAI Publication No. 2007-265546).

As described above, as a method of measuring the offset value with respect to the DTM type disk, there is a method of calculating the offset value by recording data for measurement on a disk and reading out the data for measurement by a magnetic head. In the DTM type disk, the data for measurement is written on a magnetic region formed in a pattern by a write head of the magnetic head.

However, when an offset is greatly varied when a disk rotates once due to a factor such as a disk runout and the like, there is a possibility that the data for measurement cannot be securely written on a magnetic region. In this case, a measurement accuracy of the offset value is lowered because the data for measurement cannot be read out with a pinpoint accuracy.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is a view showing a case that the write position of the offset measuring position information is optimum according to the embodiment;

FIG. 7 is a view showing a state that the write position of the offset measuring position information is offset to an outer peripheral side according to the embodiment;

FIG. 8 is a view showing a profile of position error information according to the embodiment;

FIG. 18 is a flowchart explaining an offset measuring process according to the embodiment.

DETAILED DESCRIPTION

Various embodiments according to the invention will be described hereinafter with reference to the accompanying drawings. In general, according to one embodiment of the invention, there is provided a disk drive which can measure an offset value with a pinpoint accuracy even if an offset is greatly varied when a disk rotates once.

(Arrangement of Disk Drive)

Figure 1:
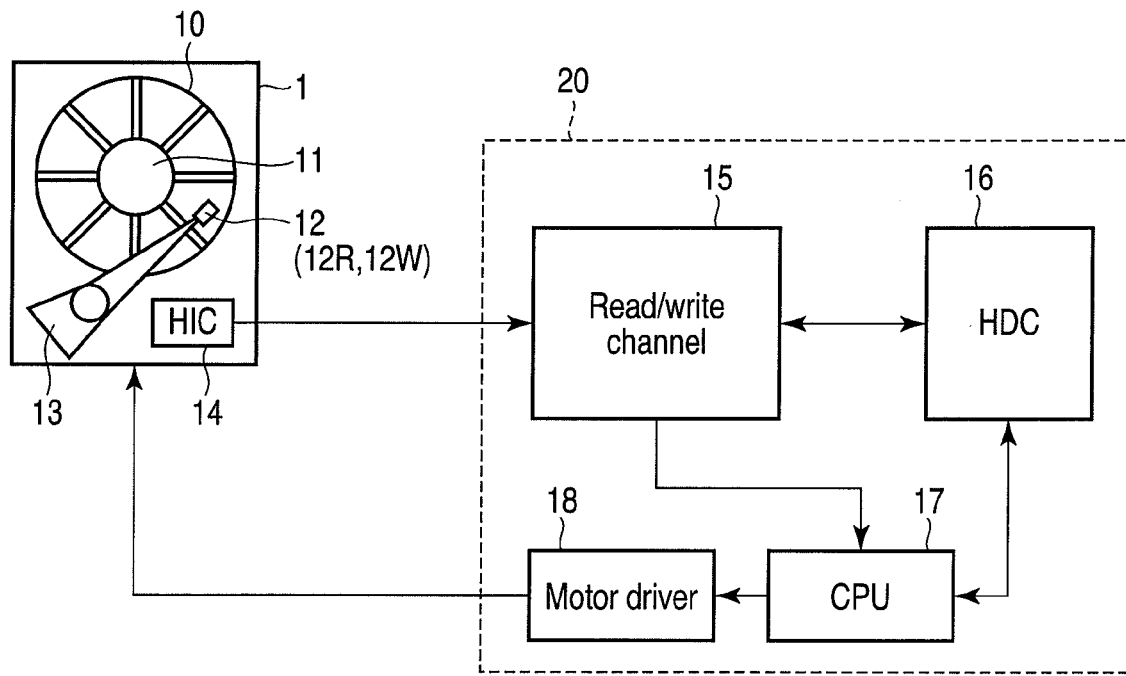
FIG. 1 is a block diagram explaining an arrangement of a disk drive according to an embodiment of the present invention.

According to an embodiment, FIG. 1 shows a block diagram explaining an arrangement of a disk drive according to the embodiment.

As shown in FIG. 1, the disk drive 1 of the embodiment has a disk 10 as magnetic recording medium, a spindle motor (SPM) 11 for rotating the disk 10, a magnetic head 12, and an actuator 13 on which the magnetic head 12 is mounted. The magnetic head 12 has a structure in which a read head 12R and a write head 12W are separately mounted on the one slider. The read head 12R read outs user data and servo information recorded on the disk 10 therefrom. The write head 12W writes user data and offset measuring position information which is offset measuring data to be described later on the disk 10.

Figure 2:
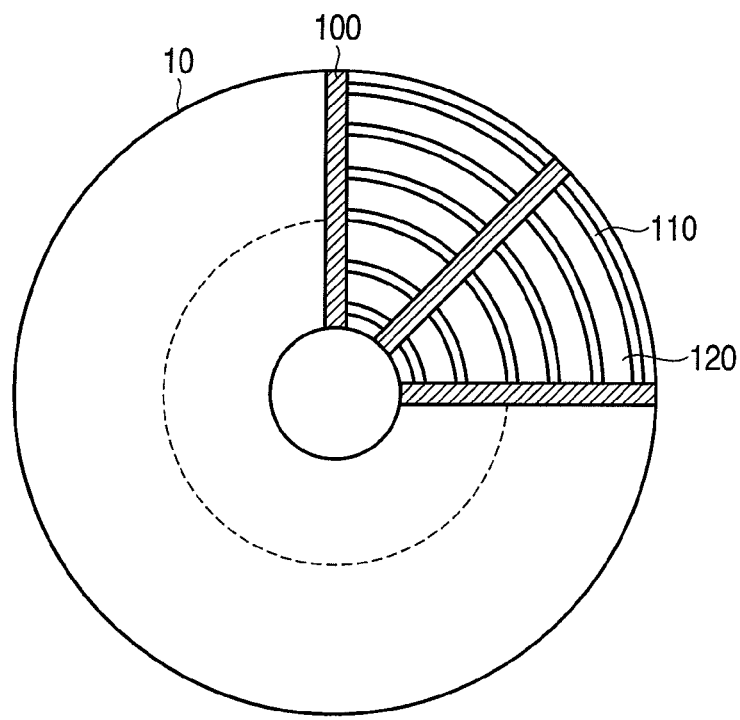
FIG. 2 is a view explaining a structure of a DTM type disk according to the embodiment.

As shown in FIG. 2, the disk 10 is a discrete track medium (DTM) type disk. The disk 10 has lands 110 and grooves 120 separately and concentrically formed thereon. The lands 110 are magnetic regions, which are data regions where user data is recorded and each of which is composed of a magnetic layer, and the grooves 120 are non-magnetic regions (regions where data cannot be magnetically recorded). That is, the lands 110 which constitute data tracks and non-magnetic guard bands composed of the grooves 120 are patterned so that they are disposed concentrically.

Further, radial servo regions 100 are formed on the disk 10 in a peripheral direction at intervals. The servo regions 100 are regions where servo information is recorded to position the magnetic head 12 to a position designated on the disk (target data tracks). The servo regions 100 are formed in a pattern in which lands as the magnetic regions and grooves as the non-magnetic regions are mixed likewise the data regions.

The servo information has address information and servo burst signals A to D when classified roughly. The address information is a code which shows a track address (or cylinder address) for identifying the data tracks and a sector address for identifying data sectors. The servo burst signals are precise position information for calculating position error information PES for detecting a position in the data tracks.

The actuator 13 has a suspension arm on which the magnetic head 12 is mounted, an arm, and a voice coil motor (VCM) and moves the magnetic head 12 in a radial direction on the disk 10.

Further, the disk drive 1 has a head amplifier unit 14, a read/write channel 15, a hard disk controller (HDC) 16, a microprocessor (CPU) 17, and a motor driver 18. The motor driver 18 has an SPM driver for supplying a drive current to the SPM 11 and a VCM driver for supplying a drive current to the VCM of the actuator 13. The VCM driver supplies the drive current to the VCM of the actuator 13 in response to the head positioning control (servo control) of the CPU 17 and moves the magnetic head 12 in the radial direction on the disk 10.

The head amplifier unit 14 has a read amplifier for amplifying a read signal read by the read head 12R of the magnetic head 12 and outputting it to the read/write channel 15. Further, the head amplifier unit 14 has a write driver for converting write data output from the read/write channel 15 into a write signal (write current) and supplying it to the write head 12W of the magnetic head 12.

The read/write channel 15 is a signal processing unit for processing a read/write data signal. The read/write channel 15 has a unit for modulating or demodulating the user data and the offset measuring position information which is described later and a unit for demodulating the servo information. The HDC 16 constitutes an interface between the disk drive 1 and a host system (personal computer and digital equipment) and controls a read/write transfer between the user data and the host system. Further, the HDC 16 controls a read/write operation of the read/write channel 15.

The CPU 17 is a main controller of the disk drive 1 which is a main element of a servo system for executing the head positioning control (servo control). The CPU 17 has a dynamic offset control (DOC) function, an offset measuring function relating to the DOC, and a self servo write function according to the embodiment together with the head positioning control function.

(Dynamic Offset Control)

An offset measuring process in the disk drive 1 of the embodiment will be explained below.

First, the dynamic offset control (DOC) relating to the offset measuring process of the embodiment will be explained.

Figure 3:
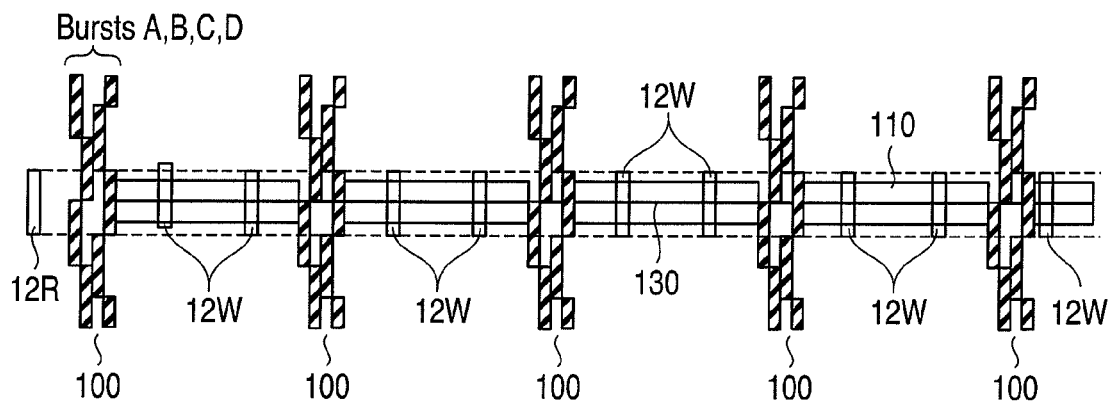
FIG. 3 is a view showing a state of a data track when no disk runout exists according to the embodiment.

FIG. 3 is a view showing a state of the data tracks on the DTM type disk 10 when a disk runout does not exist. The data tracks are lands 110 on which data is recorded or lands 110 to which data is to be recorded. Further, the servo regions 100 are regions where the servo information is recorded. In the embodiment, only the servo burst signals (precise position information) A to D are illustrated as the servo information of the servo regions 100 for the purpose of convenience. Address information, a synchronous signal, and the like are recorded (formed in a pattern) in the servo regions 100 in addition to the servo burst signals.

In the disk drive 1, the CPU 17 positions the write head 12W on a center line 130 of the data tracks (lands 110) based on the servo information read by the read head 12R and causes the write head 12W to execute a data write operation. In this case, since the disk runout does not exist, the loci of the data tracks agree with the regions of the lands 110. Ordinarily, the disk runout means a state that a servo track, which is a locus of the disk 10 when it rotates once, has a deviation to a circular rotation locus about the center of rotation of the disk 10 in the same servo address (track address).

Figure 4:
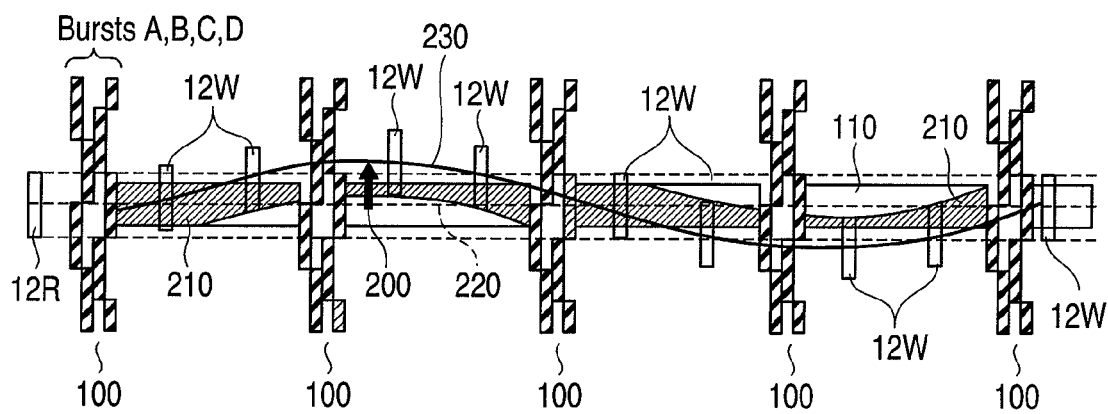
FIG. 4 is a view showing a state of a data track when a disk runout exists according to the embodiment.

FIG. 4 is a view showing a state of data tracks when a disk runout exists. When the disk runout exists, the position of the read head 12R (center line 220 of the lands 110) and the amount of offset of the data tracks (position of the write head 12W) change when the disk 10 rotates once as shown in FIG. 4, and a state, in which the locus of the write head 12W (center line 230) is different from those of the lands 110, occurs.

In this state, an offset of the data tracks which changes when the disk 10 rotates once is called a dynamic offset (DO), and the amount of offset is called a dynamic offset value (which may be simply shown as an offset value). Note that, in FIG. 4 and the like, an arrow shown by reference numeral 200 shows that a DO variation occurs.

Data recording regions (which becomes the data tracks) 210 are formed in the lands 110 according to the locus of the write head 12W. However, since the read head 12R is positioned so as to travel on the lands 110, it cannot obtain a magnetic recording signal from a region other than the data recording regions 210 on the lands 110.

When the disk runout exists as described above, a bit error rate (BER) is deteriorated when recorded data is reproduced by the read head 12R. Thus, when data is written, the CPU 17 of the disk drive 10 executes the dynamic offset control (DOC) for adjusting the dynamic offset 200 in synchronization with the rotation of the disk 10 so that the write head 12W travels on the lands 110. In particular, the DOC, which is executed when the write head 12W is positioned to the lands 110 on the DTM type disk 10 at the time data is written, is called a write DOC.

In the write DOC operation, the dynamic offset value, which is DO information in the respective data tracks (lands 110), is necessary. Thus, in the disk drive 1 of the embodiment, the CPU 17 executes the offset measuring process for measuring the dynamic offset value. Specifically, the CPU 17 executes the offset measuring process each time when, for example, the disk drive 1 starts. Further, the CPU 17 may execute the offset measuring process when it detects a disk shift by which the center of the disk 10 is shifted while the disk drive 10 is in operation. A method of detecting the disk shift may be a method of determining it by, for example, the DO based on the change of intervals of the servo regions 100. Further, the CPU 17 may execute the offset measuring process by determining that the disk shift is detected when a disturbance such as shock and the like is detected by a shock sensor while the disk drive 10 is in operation. When the disk shift occurs here, an amount of the disk runout changes. The disk runout is caused by a mounting error and the like of the spindle motor 11 of the disk drive 1.

(Offset Measuring Process)

The offset measuring process of the embodiment will be explained below referring to FIGS. 5 to 16 and FIGS. 17, 18.

In the embodiment, the disk drive 10 writes the offset measuring position information (E, F) on the disk 10 as the offset measuring data. The offset measuring position information (E, F) is precise position information likewise the servo burst signals A to D. That is, the offset measuring position information is composed of burst signals E, F (which may be shown as bursts E, F) which correspond to the servo burst signals A to D included in the servo information and are two offset measuring burst signals whose phases are dislocated in a the radial direction and a peripheral direction.

The CPU 17 calculates the dynamic offset value (DO value) based on the offset measuring position information read by the read head 12R. The CPU 17 sets a land 110 which exists in the innermost peripheral region on the disk 10 as a measuring track and sets a region just behind, for example, the servo regions 100 as a write position at which the offset measuring position information is written. The measuring track is set as a region to which ordinary user data is not written.

The CPU 17 causes the magnetic head 12 to seek up to the measuring track by controlling drive of the actuator 13 (block 400). Ordinarily, the CPU 17 causes the write head 12W to write the offset measuring position information to the lands 110 of the measuring tracks by executing a write DOC.

Figure 17:
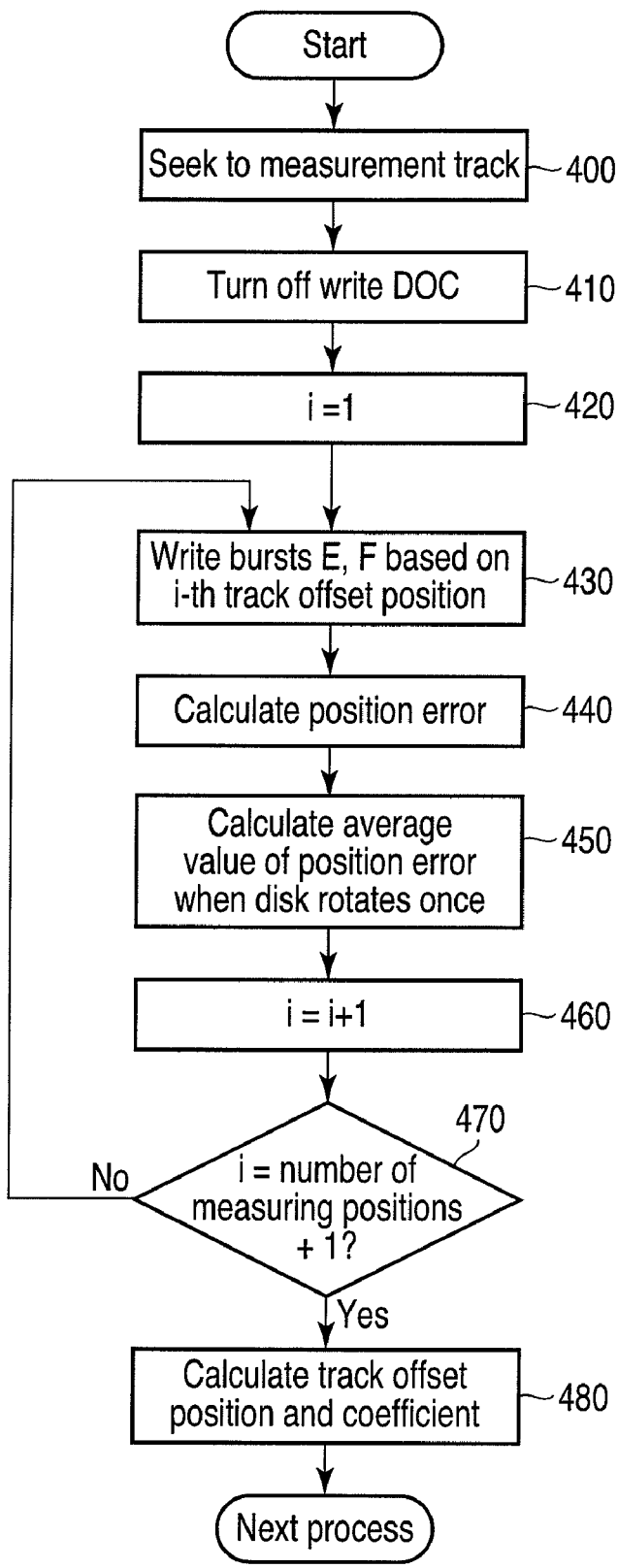
FIG. 17 is a flowchart explaining an adjustment process of the write position of the offset measuring position information according to the embodiment.

When the DO greatly varies, the offset measuring position information cannot be written on the lands 110. To cope with the above problem, the CPU 17 executes a process for adjusting a position to which the offset measuring position information is written to write the information at an optimum position as shown in the flowchart of FIG. 17.

First, the CPU 17 turns off the write DOC function and does not execute the dynamic offset control (DOC) operation when the offset measuring position information is written (block 410). Next, the CPU 17 writes the offset measuring position information (E, F) on the lands 110 of the measuring tracks by the write head 12W using the self servo write function just behind the servo burst signals A to D of the servo regions 100 (block 430).

As shown in FIG. 6, the servo burst signal E is written to an i-th track offset position, that is, a position, for example, just behind an initial servo regions 100 on the lands 110 by the write head 12W while the disk 10 is rotated once. Further, the servo burst signal F is written after a predetermined track is offset. FIG. 6 shows a state that the offset measuring position information (E, F) is written to an optimum position on the lands 110. That is, when the offset measuring position information (E, F) is written to the optimum write position, boundary loci of servo burst signals E, F agree with the center line 220 on the lands 110.

Next, the CPU 17 offsets the read head 12R across tracks a predetermined distance obtained previously and reproduces the offset measuring position information (E, F) recorded using the self servo write by the write head 12W. The CPU 17 calculates the position error information (PES) of the read head 12R based on the reproduced offset measuring position information (E, F) (block 440). The CPU 17 calculates the average value of the position error information (PES) calculated while the disk 10 rotates once (block 450). The above process is repeated as many times as the number of measurement positions set on the lands 110 (blocks 460, 470).

That is, the CPU 17 directly observes the offset values (the dynamic offset values DO) of the read head 12R and the write head 12W which are changed when the disk 10 rotates once with a pinpoint accuracy by calculating the average value of the position error information (PES) while the disk 10 rotates once.

As shown by the following expression (1), the position error information PES is calculated from respective amplitude values bstE, bstF when the offset measuring position information (E, F) is reproduced.

$$PES=(bstE-bstF)/(bstE+bstF) \qquad (1)$$

Further, as shown in the following expression (2), offset value measuring position information OP is calculated from the position error information PES and conversion coefficient PESg. The conversion coefficient PESg is a gain coefficient of the respective amplitude values bstE, bstF and the position error information.

$$OP=PES \times PESg \qquad (2)$$

When the DO greatly varies as described above, the offset measuring position information cannot be written on the lands 110 with a pinpoint accuracy. Thus, to write the offset measuring position information to an optimum position, a process for adjusting a write position of the offset measuring position information is necessary. The process for adjusting the write position will be specifically explained below referring to FIGS. 5 to 10B.

Figure 5:
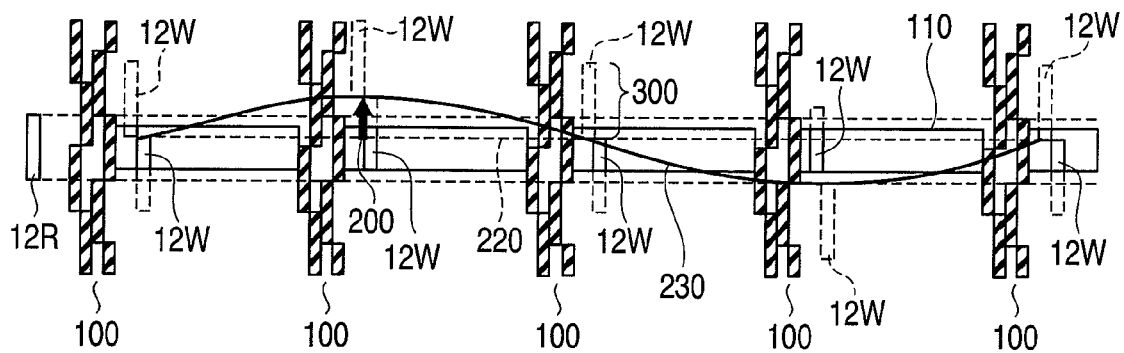
FIG. 5 is a view showing a state that a write position of offset measuring position information is offset to an inner peripheral side according to the embodiment.

FIG. 5 shows a state that the dynamic offset 200 greatly varies, and the position to which the offset measuring position information is written by the write head 12W is offset on an inner peripheral side of the disk 10. Further, FIG. 7 shows a state that the dynamic offset 200 greatly varies, and the position to which the offset measuring position information is written by the write head 12W is offset on an outer peripheral side of the disk 10. FIG. 6 shows a case that the write position of the offset measuring position information is optimum as described above.

That is, when the write position of the offset measuring position information (E, F) is optimum as shown in FIG. 6, the boundary locus 220 between the burst E and the burst F is located on the center line of the lands 110. In contrast, when the write position is offset as shown in FIGS. 5 and 7, the boundary locus 220 between the burst E and the burst F is dislocated from the center line of the lands 110. In this case, the amount of dislocation is changed by the influence of the track width of the write head 12W, an environmental temperature, a floating amount, and the like.

FIG. 8 is a view showing a profile of the position error information (PES) calculated by the CPU 17 according to the write position of the offset measuring position information. As shown in FIG. 8, when the write position of the offset measuring position information is the optimum position, a profile 81 becomes point symmetry. However, a profile 80 when the write position is offset to the inner peripheral side and a profile 82 when the write position is offset to the outer peripheral side do not become point symmetry.

Figure 9:
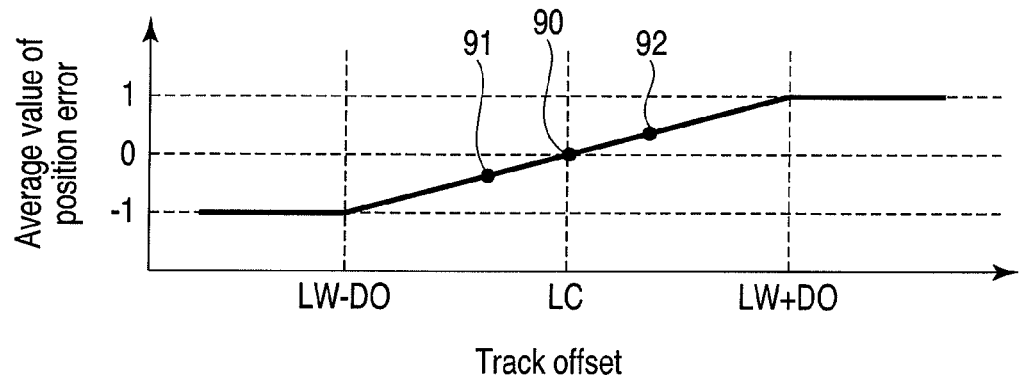
FIG. 9 is a view showing the average value of the position error information when a disk rotates once according to the embodiment.

FIG. 9 shows the average value of the position error information (PES) when the disk rotates once at the write position of the offset measuring position information. That is, in a case of the center LC of the lands 110 whose write position is the optimum position, the average value 90 thereof becomes zero. In contrast, when the write position is dislocated with respect to the center of the lands 110 by the DO, average values 91, 92 which vary in the range of from −1 to +1 are obtained. Note that, in FIG. 9, LW means the width of the lands 110.

From what has been described above, the CPU 17 can set the boundary loci of the bursts E, F of the offset measuring position information (E, F) on the center line of the lands 110 by calculating the write position (track offset value) at which the average value of the position error information (PES) becomes zero and the conversion coefficient PESg (block 480).

Figure 10A:
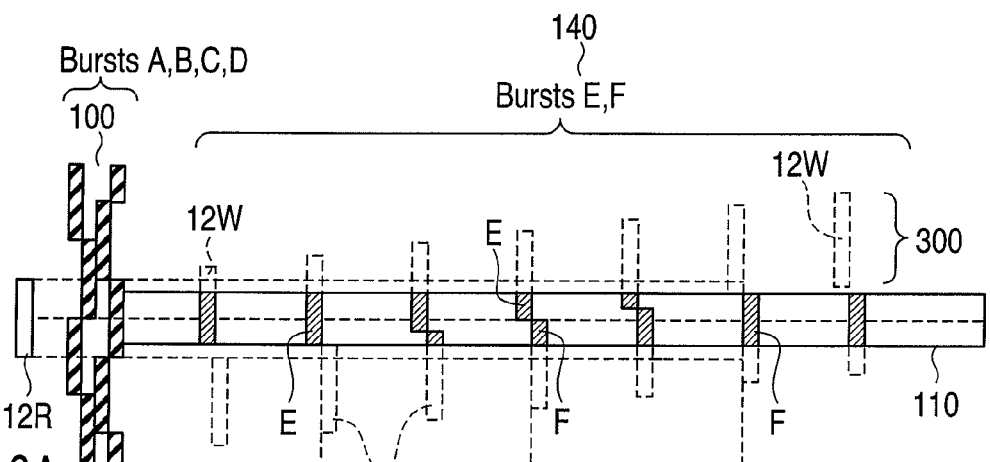
FIGS. 10A and 10B are views explaining a method of calculating a conversion coefficient according to the embodiment.
Figure 10B:
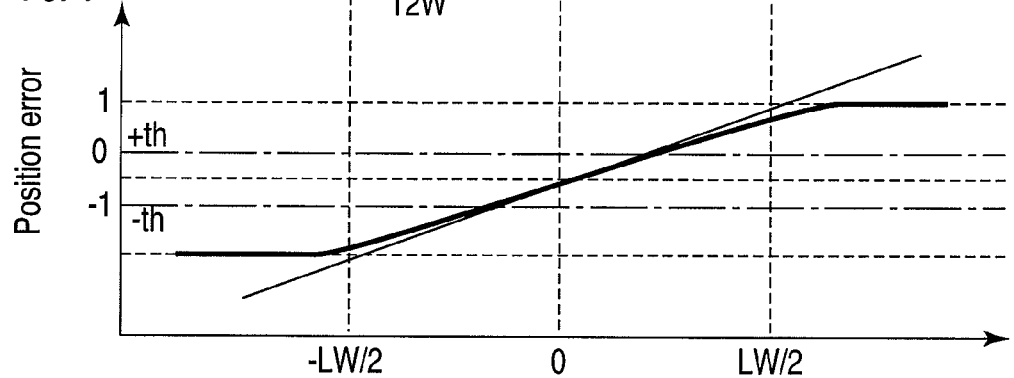

FIGS. 10A, 10B are views explaining a method of calculating the conversion coefficient (PESg) for converting the respective amplitude values of the bursts E, F of the offset measuring position information written on the disk 10 into the position error information. As shown in FIG. 10A, the embodiment shows a case that the write positions of the bursts E, F of the offset measuring position information are dislocated in a traveling direction of the head. Note that it is not always necessary to write the bursts E, F by dislocating them as shown in FIG. 10A. Further, the CPU 17 executes the calculation process simultaneously with an adjustment process of the write position of the offset measuring position information (block 480).

The CPU 17 calculates the position error information (PES) shown in FIG. 10B by reading out the bursts E, F of the offset measuring position information written just behind a particular servo region (servo sector) 10 by the read head 12R. The inverse number of an inclination of a graph shown in FIG. 10B becomes the conversion coefficient PESg of the amplitude values and the position error information. However, in an actual measuring process, a profile of the PES is distorted as compared with an ideal value to an ideal condition. Thus, the conversion coefficient PESg may be calculated by a collinear approximation in the vicinity of a point of origin.

Next, a method of measuring the dynamic offset value DO of the embodiment will be specifically explained referring to FIGS. 11 to 16 and FIG. 18.

As shown in FIG. 18, the CPU 17 makes the write DOC function effective and sets parameters relating to the DOC function (blocks 500, 510, 520). The CPU 17 writes the bursts E, F of the offset measuring position information 140 to the optimum position of the lands 110 (measuring tracks) on the disk 10 set by the write adjustment described above (block 530).

Figure 11:
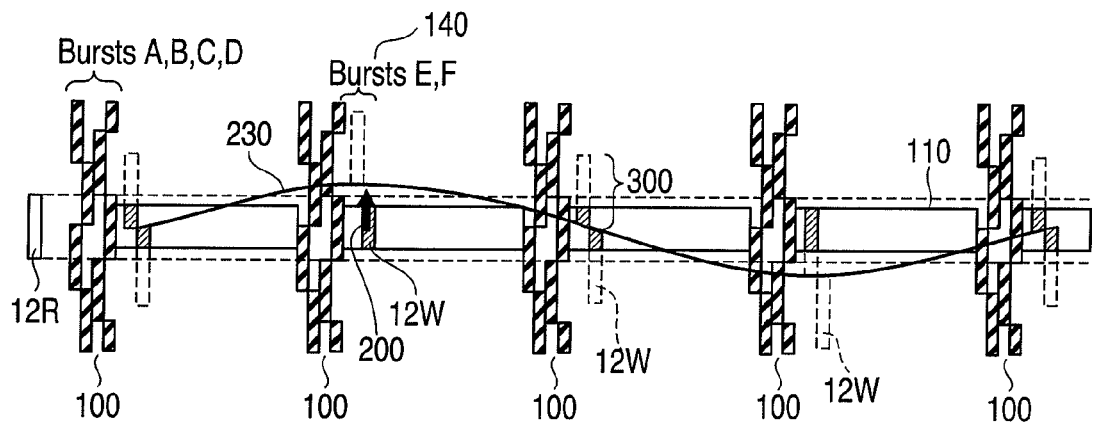
FIG. 11 is a view showing a state that the offset measuring position information is written according to the embodiment.

That is, as shown in FIG. 11, the servo burst signal E is written to an i-th track offset position, for example, a position just behind an initial servo region 100 by the write head 12W while the disk 10 is rotated once. Further, the servo burst signal F is written after a predetermined track is offset.

Figure 12:
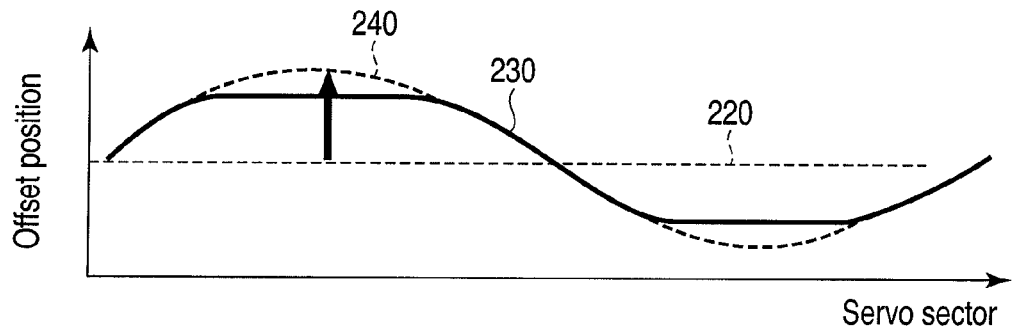
FIG. 12 is a view showing a profile of a dynamic offset according to the embodiment.

FIG. 12 is a view when the dynamic offset 200 is observed at the time the disk 10 rotates once. That is, an amount of offset position error with respect to the center line 200 on the lands 110 can be observed as the DO shown by a solid line 230. Here, an actual dynamic offset value DO is shown by a dotted line 240 and cannot be directly observed.

Thus, the CPU 17 estimates the actual dynamic offset 240 from a profile of the solid line 230. Specifically, the CPU 17 calculates the maximum dynamic offset value DO(j) of the offset measuring position information when the disk 10 rotates once (block 540). The CPU 17 calculates the estimated dynamic offset value DO using the calculated maximum dynamic offset value DO(j) (block 550). The CPU 17 stores the calculated estimated value DO as a DOC set value of an actual DOC function (block 560).

Figure 13:
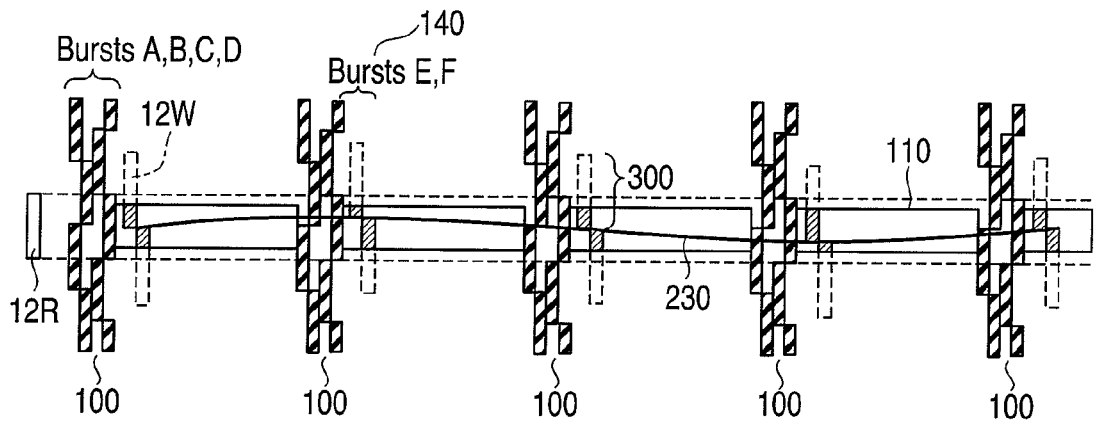
FIG. 13 is a view showing a state that the offset measuring position information is written according to the embodiment.

FIG. 13 is a view showing a state that the offset measuring position information 140 is written to the lands 110 on the disk 10 so that the estimated value Do described above is cancelled. That is, the CPU 17 executes the write DOC using the estimated dynamic offset value DO and writes the bursts E, F of the offset measuring position information on the lands 110.

Figure 14:
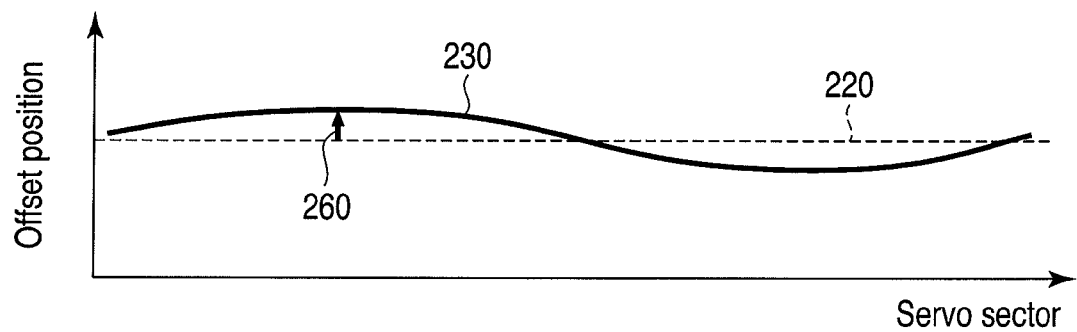
FIG. 14 is a view showing a profile of the dynamic offset according to the embodiment.

FIG. 14 is a view when the dynamic offset 230 is observed at the time the disk 10 rotates once. As shown in FIG. 14, the amount of offset position error is reduced with respect to the center line 220 on the lands 110. However, since an estimated error 260 when the estimated dynamic offset value Do is used exists, the offset position error variation remains although its amount is very small. Further, since the dynamic offset 230 includes a conversion error of the amplitude value of the position error information PEs and the position information, it is not always a true value.

Figure 15:
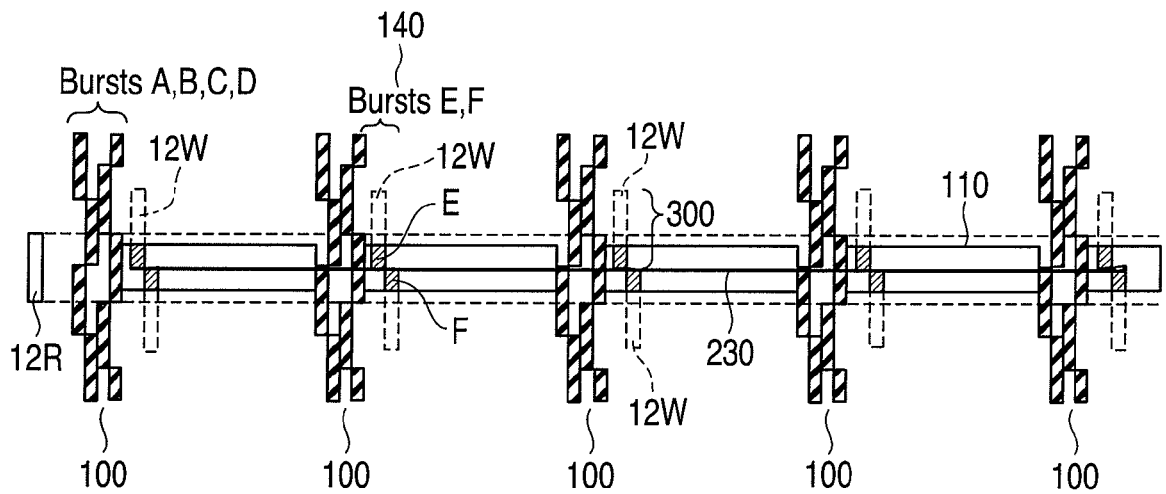
FIG. 15 is a view showing a state that the offset measuring position information is written according to the embodiment.

FIG. 15 is a view when the offset measuring position information is written to the lands 110 on the disk 10 so that the DO is cancelled in consideration of the estimated value DO and the estimated error 260 described above. That is, the CPU 17 executes the write DOC in consideration of the estimate dynamic offset value DO and the estimated error 260 and writes the bursts E, F of the offset measuring position information on the lands 110.

Figure 16:
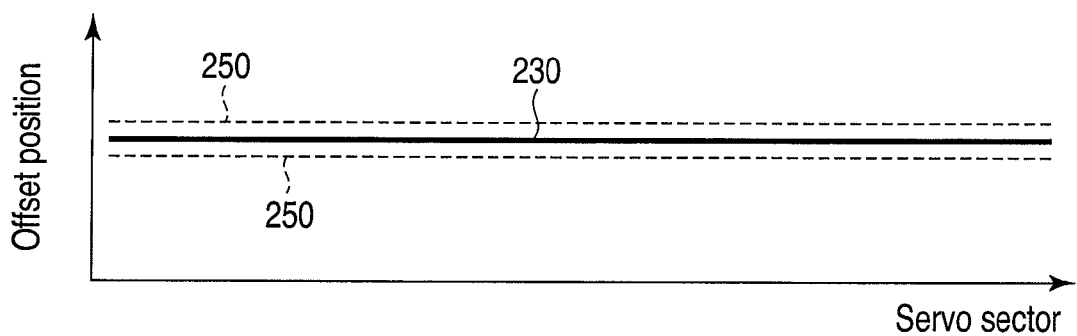
FIG. 16 is a view showing a profile of the dynamic offset according to the embodiment.

FIG. 16 shows the dynamic offset 230 in which the offset position error variation is within the range of the threshold value 250 when the dynamic offset value DO predicted from the estimated dynamic offset value DO and the estimated error 260 is correct. That is, the CPU 17 repeats the processes from block 530 until the amount of error of the observed dynamic offset value DO becomes within a threshold value TH (blocks 570, 580). A conversion error is so small here that it can be neglected near 0. The CPU 17 sets the DOC set value of the write DOC, which is set when the offset position error variation is within the threshold value, as the dynamic offset value DO in an observed track.

As described above, according to the embodiment, the estimated dynamic offset value DO is calculated by writing the offset measuring position information on the lands 110 which are designated measuring tracks and reading out the offset measuring position information. A process for writing the offset measuring position information on the lands 110 is repeated using the estimated dynamic offset value DO until the amount of variation of the offset position error with respect to the center line 220 on the lands 110 becomes within the threshold value. With this operation, the offset measuring position information can be written to the optimum position on the lands 110.

Accordingly, the CPU 17 can reproduce the offset measuring position information from the optimum position on the lands 110 with a pinpoint accuracy and set the actual dynamic offset value DO which is necessary to a highly accurate DOC. In other words, the offset value can be measured with a pinpoint accuracy in the disk drive using the DTM type disk even if the offset is greatly varied when the disk rotates once.

Note that the embodiment can be also applied to a disk drive which uses a disk whose entire surface is composed of a magnetic region. In this case, the write position of the offset measuring position information may be adjusted by a method of determining a position at which the average value of PES is made to zero when a disk rotates once by offsetting the read head 12R across tracks with respect to the burst E and the burst F which are written using the self servo write. Since the method does not include a recording operation of the offset measuring position information, a measuring time can be reduced. However, the method cannot be applied to the DTM type disk 10 because the positions of the lands 110 are fixed although this is a matter of course. Further, a method of executing the read DOC function, which executes the DOC when data is read out after an estimate DO value is calculated may be used as a method of calculating the dynamic offset value DO using the bursts E, F written by the self servo write function. This method is a method of reproducing the position error information by the read DOC function and setting the DOC set value which is set when an error is within the threshold value as the dynamic offset value DO. Since the method does not include a recording operation of the offset measuring position information, a measuring time can be reduced. However, the method cannot be applied to the DTM type disk 10 because the positions of the lands 110 are fixed although this is a matter of course.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a discrete track media type disk comprising data regions and servo regions, the data regions comprising magnetic recording regions of data and non-magnetic regions separate from the magnetic recording regions, and the servo regions comprising servo information;
a magnetic head comprising a write head and a separate read head;
an actuator on which the magnetic head is mounted and configured to move the magnetic head in a radial direction on the disk; and
a controller configured to control the actuator and to position the magnetic head to a position designated on the disk,
wherein the controller is configured to make offset adjustment based on a dynamic offset value when the magnetic head is positioned to the designated position on the disk in accordance with a data write operation or a data read operation,
the controller is configured to write offset measuring position information for measuring the dynamic offset value to a first position in the magnetic regions on the disk,
the controller is configured to reproduce the offset measuring position information,
the controller is configured to calculate the dynamic offset value using the offset measuring position information, and
the controller is configured to write updated offset measuring position information to the first position of the magnetic regions using an estimated value according to a maximal dynamic offset value of the calculated dynamic offset value.

2. The disk drive of claim 1, wherein the offset measuring position information comprises a burst signal corresponding to a servo burst signal in the servo information and comprises two offset measuring burst signals whose phases are different in a radial direction and a peripheral direction.

3. The disk drive of claim 2, wherein the controller is configured to write the offset measuring position information to the magnetic regions in such a manner that the boundary loci of the respective offset measuring burst signals of the offset measuring position information correspond with a central portion of the magnetic regions when the disk rotates once.

4. The disk drive of claim 3, wherein the controller is configured to write offset measuring burst signals to positions offset in the radial direction on the disk, and
the controller is configured to set a position at which the average values of the amplitude values of the offset measuring burst signals when the disk rotates once become equal to each other as the first position.

5. The disk drive of claim 4, wherein the controller is configured to calculate a conversion coefficient for conversion to position error information from the calculated ratio of the amplitude values of the offset measuring burst signals when the disk rotates once based on the offset measuring burst signals.

6. The disk drive of claim 3, wherein the controller is configured to calculate a conversion coefficient for conversion to position error information from the calculated ratio of the amplitude values of the offset measuring burst signals when the disk rotates once based on the offset measuring burst signals.

7. The disk drive of claim 2, wherein the controller is configured to calculate a conversion coefficient for conversion to position error information from the calculated ratio of the amplitude values of the offset measuring burst signals when the disk rotates once based on the offset measuring burst signals.

8. The disk drive of claim 7, wherein the controller is configured to calculate an amount of position error of the magnetic head when the disk rotates once by multiplying the conversion coefficient and the ratio of the amplitude values of the offset measuring burst signals and converting a resulting product to the position error information.

9. The disk drive of claim 8, wherein the controller is configured to correct the amount of position error when the disk rotates once, to repeatedly write the offset measuring burst signals until the amount of position error calculated based on the offset measuring burst signals is within a threshold value, and to search the first position.

10. A method of determining an offset in a disk drive comprising a discrete track media type disk comprising data regions and servo regions, the data regions comprising magnetic recording regions of data and non-magnetic regions arranged separately from the magnetic recording region, and the servo regions comprising servo information recorded to the servo regions and a magnetic head comprising a write head and a separate read head, the method comprising:

writing offset measuring position information for measuring a dynamic offset value used in a dynamic offset control to a first position comprised in the magnetic regions on the disk when the magnetic head is positioned to the designated position on the disk in accordance with a data write operation or a data read operation;

reproducing the offset measuring position information by the read head;

calculating the dynamic offset value using the offset measuring position information recorded to the first position; and writing updated offset measuring position information to the first position of the magnetic regions using an estimated value according to a maximal dynamic offset value of the calculated dynamic offset value.

* * * * *